(12) United States Patent
Modha (10) Patent No.: US 11,295,204 B2
(45) Date of Patent: Apr. 5, 2022

(54) AREA-EFFICIENT, RECONFIGURABLE, ENERGY-EFFICIENT, SPEED-EFFICIENT NEURAL NETWORK SUBSTRATE

(71) Applicant: INTERNATIONAL BUSINESS MACHINES CORPORATION, Armonk, NY (US)

(72) Inventor: Dharmendra S. Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 902 days.

(21) Appl. No.: 15/400,319

(22) Filed: Jan. 6, 2017

(65) Prior Publication Data

US 2018/0197075 A1 Jul. 12, 2018

(51) Int. Cl.
```
G06N 3/06      (2006.01)
G06N 3/063     (2006.01)
G06N 3/04      (2006.01)
```

(52) U.S. Cl.
CPC .............. *G06N 3/063* (2013.01); *G06N 3/04* (2013.01)

(58) Field of Classification Search
CPC combination set(s) only.
See application file for complete search history.

(56) References Cited

U.S. PATENT DOCUMENTS

| | | |
|---|---|---|
| 5,714,768 A | 2/1998 | Ovshinsky et al. |
| 6,389,404 B1 | 5/2002 | Carson et al. |
| 9,245,222 B2* | 1/2016 | Modha ............ G06N 3/04 |
| 2005/0149936 A1* | 7/2005 | Pilkington ....... G06F 9/3851 |
| | | 718/102 |
| 2008/0235700 A1* | 9/2008 | Iguchi ............ G06F 9/5077 |
| | | 718/104 |
| 2010/0268912 A1* | 10/2010 | Conte ............ G06F 11/3409 |
| | | 712/20 |

(Continued)

FOREIGN PATENT DOCUMENTS

| | | |
|---|---|---|
| JP | 2010/092483 A | 4/2010 |
| JP | 2015/517712 A | 6/2015 |

(Continued)

OTHER PUBLICATIONS

Daulani et al., Precedence Constraint Task Scheduling for Multicore Multikernel Architecture, Aug. 2014, 11 pages (Year: 2014).*

(Continued)

*Primary Examiner* — Omar F Fernandez Rivas
*Assistant Examiner* — Tri T Nguyen
(74) *Attorney, Agent, or Firm* — Erik A. Huestis; Stephen J. Kenny; Foley Hoag, LLC (57) ABSTRACT

Architectures for multicore neuromorphic systems are provided. In various embodiments, a neural network description is read. The neural network description describes a plurality of logical cores. A plurality of precedence relationships are determined among the plurality of logical cores. Based on the plurality of precedence relationships, a schedule is generated that assigns the plurality of logical cores to a plurality of physical cores at a plurality of time slices. Based on the schedule, the plurality of logical cores of the neural network description are executed on the plurality of physical cores.

28 Claims, 6 Drawing Sheets

(56) References Cited

U.S. PATENT DOCUMENTS

| | | | |
|---|---|---|---|
| 2013/0073497 A1* | 3/2013 | Akopyan | G06N 3/049 |
| | | | 706/27 |
| 2015/0106314 A1 | 4/2015 | Birdwell et al. | |
| 2015/0324684 A1* | 11/2015 | Alvarez-Icaza Rivera | ............... |
| | | | G06N 3/04 |
| | | | 706/26 |
| 2016/0098629 A1 | 4/2016 | Lipasti et al. | |
| 2016/0239074 A1* | 8/2016 | Lee | G06F 1/3225 |
| 2016/0247062 A1 | 8/2016 | Amir et al. | |
| 2018/0107766 A1* | 4/2018 | Dumitrescu | G06F 17/505 |
| 2018/0174041 A1* | 6/2018 | Imam | G06N 3/049 |
| 2018/0189648 A1* | 7/2018 | Sengupta | G06N 3/08 |

FOREIGN PATENT DOCUMENTS

| | | |
|---|---|---|
| JP | 2016/001417 A | 1/2016 |
| WO | 9314459 A1 | 7/1993 |

OTHER PUBLICATIONS

Robert Preissl et al: "Compass: A scalable simulator for an architecture for cognitive computing", High Performance Computing, Networking, Storage and Analysis (SC), 2012 International Conference for, IEEE, Nov. 10, 2012.

Akopyan Filipp et al: "TrueNorth: Design and Tool Flow of a 65 mW 1 Million Neuron Programmable Neurosynaptic Chip", IEEE Transactions on Computer Aided Design of Integrated Circuits and Systems, IEEE Service Center, Piscataway, NJ, US, val. 34, No. 10, Oct. 1, 2015.

Saifullah Abusayeed et al: "Parallel Real-Time Scheduling of DAGs", IEEE Transactions on Parallel and Distributed Systems, IEEE Service Center, Los Alamitos, CA, US, vo 1 . 25, No. 12, Dec. 1, 2014.

Amir Arnon et al: "Cognitive computing programming paradigm: A Corelet Language for composing networks of neurosynaptic cores," The 2013 International Joint Conference on Neural Networks (IJCNN), IEEE, Aug. 4, 2013.

International Search Report and Written Opinion for PCT/EP2017/083881 dated Mar. 28, 2018.

Braga et al., "VANNGen: A Flexible CAD Tool for Hardware Implementation of Artificial Neural Networks," Proc of the 2005 Intl Conf on Reconfigurable Computing and FPGAs (ReConFig 2005), IEEE Computer Society, 2005.

Akopyan et al., "TrueNorth: Design and Tool Flow of a 65 mW 1 Million Neuron Programmable Neurosynaptic Chip," IEEE Transactions on Computer-Aided Design of Integrated Circuit and Systems, 34(10): 1537-1557 (2015).

JP Notice of Reasons for Refusal for JP Application No. 2019-529248 dated Jul. 26, 2021.

EPO Oral Proceedings Written Submissions Letter filed for EP Application No. 17825508.9 submitted Feb. 1, 2022.

* cited by examiner

AREA-EFFICIENT, RECONFIGURABLE, ENERGY-EFFICIENT, SPEED-EFFICIENT NEURAL NETWORK SUBSTRATE

BACKGROUND

Embodiments of the present invention relate to architectures for multicore neuromorphic systems, and more specifically, to area-efficient, reconfigurable, energy-efficient, speed-efficient neural network substrates.

BRIEF SUMMARY

According to various embodiments of the present disclosure, methods of and computer program products for configuring a neural network are provided. A neural network description is read. The neural network description describes a plurality of logical cores. A plurality of precedence relationships are determined among the plurality of logical cores. Based on the plurality of precedence relationships, a schedule is generated that assigns the plurality of logical cores to a plurality of physical cores at a plurality of time slices. Based on the schedule, the plurality of logical cores of the neural network description are executed on the plurality of physical cores According to various embodiments of the present disclosure, methods of and computer program products for operating a neural network are provided. A neuromorphic core is reconfigured. A plurality of inputs to the neuromorphic core is received. Substantially concurrently to receiving the plurality of inputs, a first plurality of outputs of a neuromorphic core are computed at a first time slice. Substantially concurrently to the computing, a second plurality of outputs of the neuromorphic core is sent. The second plurality of outputs is generated at a second time slice. The second time slice precedes the first time slice.

According to various embodiments of the present disclosure, a neurosynaptic system is provided. A reconfigurable neuromorphic core comprising a plurality of axons and a plurality of neurons is provided. An axon buffer is coupled to the plurality of axons. An off core memory is coupled to the neuromorphic core. An inter-core network is coupled to the neuromorphic core. The reconfigurable neuromorphic is operable to read a plurality of configuration parameters from the off core memory. The reconfigurable neuromorphic core is operable to reconfigure according to the plurality of configuration parameters prior to processing the plurality of inputs. The reconfigurable neuromorphic is operable to receive a plurality of inputs. The reconfigurable neuromorphic core is operable to compute a first plurality of outputs at a first time slice substantially concurrently to receiving the plurality of inputs. The reconfigurable neuromorphic is operable to send outputs generated at a second time slice via the inter-core network substantially concurrently to the computing. The second time slice precedes the first time slice.

DETAILED DESCRIPTION

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

It will be appreciated from the above exemplary description that neural networks are fundamentally parallel and distributed, thus giving inherent speed advantages that can be exploited in various embodiments. Likewise, neural networks are fundamentally energy-efficient due to the use of localized memory and event-driven computation. However, neural networks may require dedicated hardware per neuron. Requiring dedicated hardware is contrary to general CMOS methodologies, which leverage rewritability and reprogrammability.

Accordingly, the present disclosure allows preservation of the parallelism and energy efficiency advantages of a neural network while mitigating the limitations inherent in dedicated hardware within planar CMOS technology.

Brain-inspired (or neuromorphic) computing combines energy-efficiency and speed-efficiency with tileability. However, these advantages generally come at the expense of area efficiency, which is generally higher in conventional von Neumann architectures. Accordingly, in various embodiments the present disclosure provides for neuromorphic systems that maintain the energy advantages and parallelism of neuromorphic computing while optimizing the area. In particular, in various embodiments, area is saved by folding a logical network onto a physical network. In this way, repeated computation can be exploited at the cost of increased energy. In various embodiments, reconfigurable synapse weights, neuron parameters, neuron biases, and neuron destinations enable a folding process.

Figure 1:
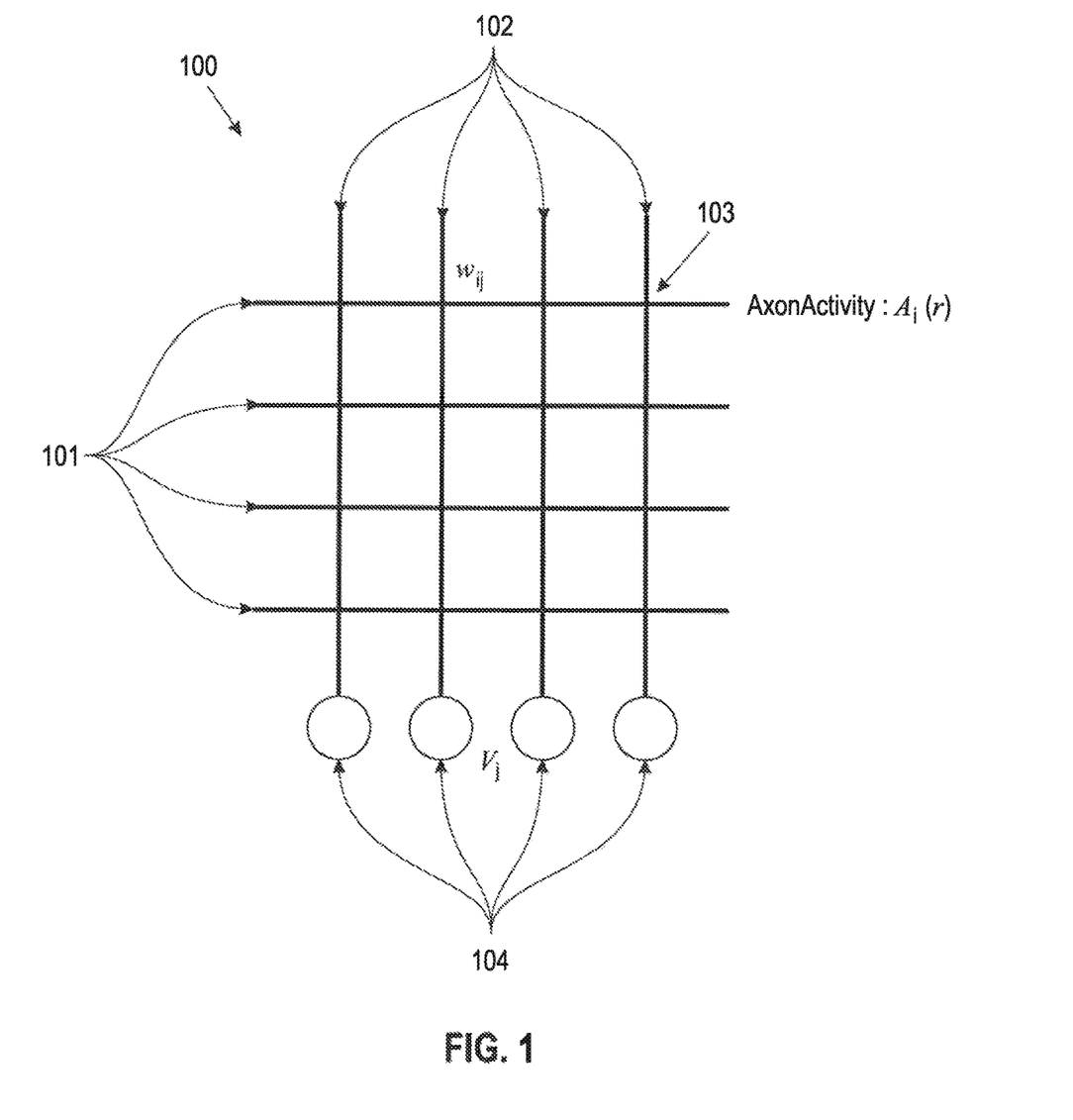
FIG. 1 depicts a neurosynaptic core according to embodiments of the present disclosure.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
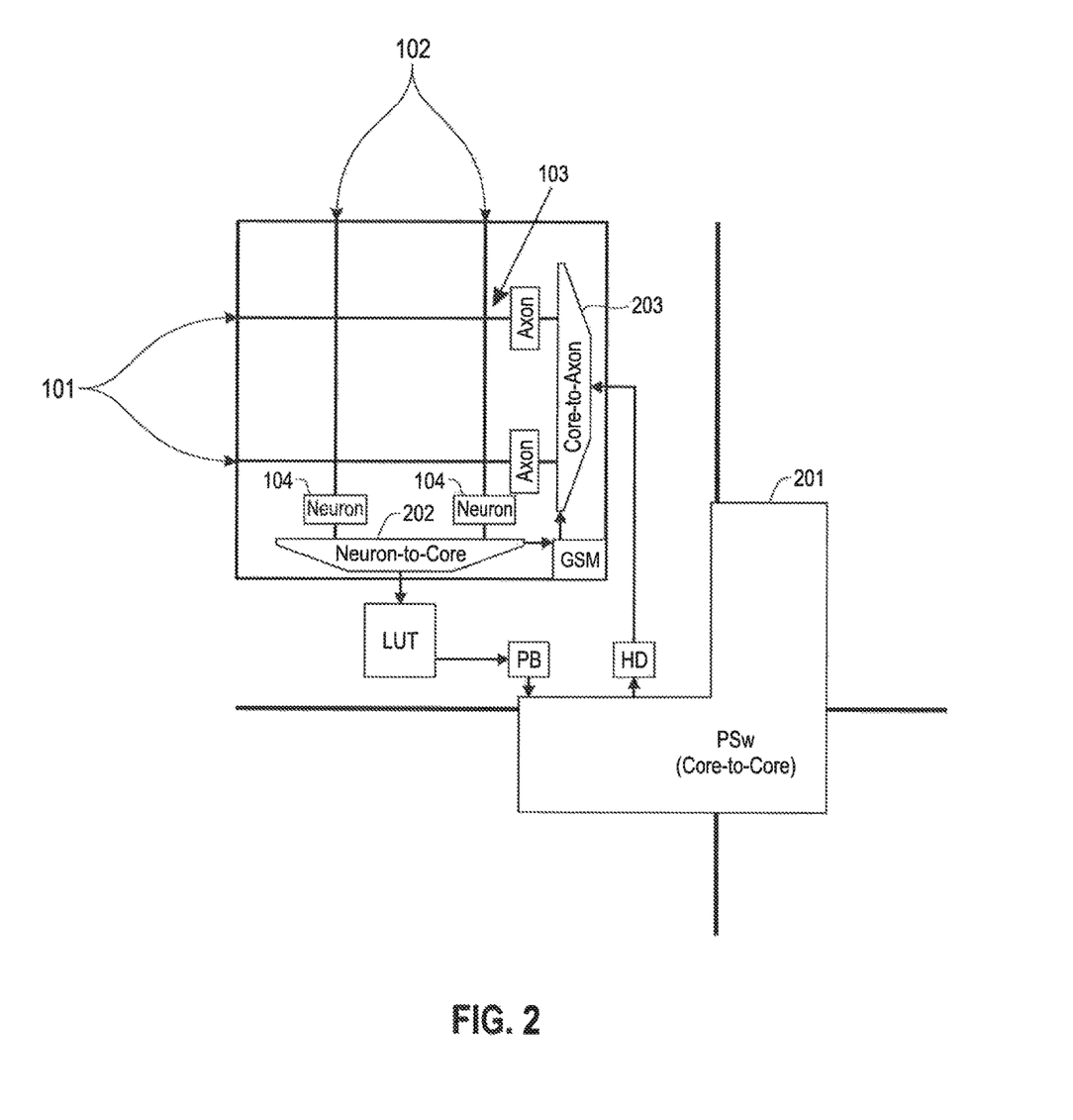
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

A logical core according to various embodiment may be defined as a node with a input (incoming) edges and n output (outgoing) edges. A logical core c carries out the computation according to Equation 1 and sends $N_c$ to targets $T_c$. In Equation 1, N and B are n×1 vectors of output neurons and biases, A is an a×1 vector of input axons, W is an n×a weight matrix, and $\sigma_c$ is a function.

$$N_c = \sigma_c(W_c \times A_c + B_c) \quad \text{Equation 1}$$

A network N of logical cores according to various embodiment may be defined according to Equation 2, where C denotes a set of logical cores, E denotes a set of directed edges between logical cores, I is a subset of C that denotes input cores, and O is a subset of C that denotes output cores.

$$N = (I, C, E, O) \quad \text{Equation 2}$$

Consider the case that N is a directed acyclic graph (DAG). Let X denote the input to cores I and let Y denote the output of cores O. In epoch t, input $X_t$ is presented to the network, and the network computes $O_t$. Epoch identifier t is not important from epoch to epoch.

Such a DAG can be used to establish precedence relationship between logical cores. In the above example, input cores in I have no precedent. The precedence relationship between cores is used to ensure that a logical core is scheduled for computation on a physical core only after all logical cores that send incoming edges to it are already scheduled.

Two logical cores $c = (W_c, A_c, B_c, \sigma_c)$ and $d = (W_d, A_d, B_d, \sigma_d)$ are said to be identical if $W_c = W_d$; $B_c = B_d$; $\sigma_c = \sigma_d$; and neither c is a precedent to d nor d is precedent to c. To perform further optimization of identical cores, each core in a system is assigned an identification number such that all identical cores receive the same identification number.

A physical core is capable of receiving parameters ($W_c$, $A_c$, $B_c$, $\sigma_c$) for a logical core c. Given these parameters, a physical core can emulate the logical core c to compute $N_c$ and send them to $T_c$.

Suppose a physical core is already loaded with parameters ($W_c$, $A_c$, $B_c$, $\sigma_c$) for logical core c. Now, for efficiency reasons, it is desirable to reuse these parameters rather than re-receiving them. So, it is desirable to emulate identical cores on the same physical core.

Suppose that there are P physical cores in the system. Let us suppose that these cores operate in lockstep. All cores go through a computation step followed by a communication step followed by a preparation step. To ensure that all communication and preparation is done, there can be a communication barrier requiring O(log P) time where all cores acknowledge that they are done and all messages are delivered.

According to various embodiments, a schedule maps the set of logical cores in a system to physical cores along with a sequence number. Given precedence and identity relationships between logical cores, it is desirable to map identical logical cores to the same physical core for energy-efficiency and to map logical cores to physical cores so as to minimize total run-time for the network. In some embodiments, these two preferences may conflict and in some embodiments, one or the other is optimized.

In some embodiments, a scheduler is provided to create a schedule. According to various embodiments, the scheduler ensures that a for a given physical core and for a given sequence number, the core has all the necessary ingredients. In particular, the scheduler ensures that a given physical core is properly configured with ($W_c$, $A_c$, $B_c$, $\sigma_c$) and that $T_c$ is available to receive $N_c$ upon computation.

According to some embodiments, neuron biases and destinations are loaded on a regular schedule. In some embodiments, weights are loaded on an irregular schedule depending upon weight reuse. In some embodiments, neuron firings move from source physical cores to destination physical core after each computation step.

Figure 3:
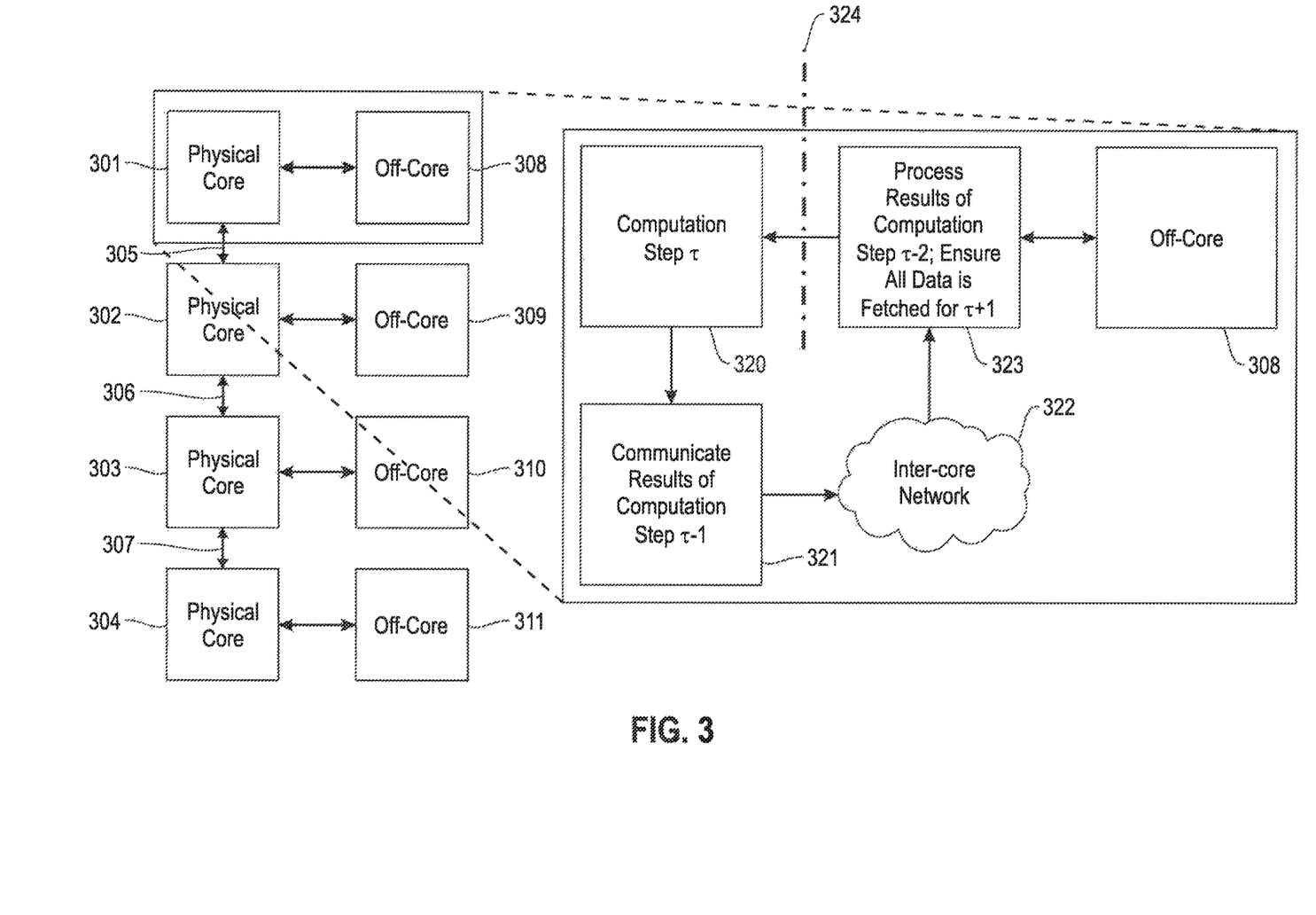
FIG. 3 illustrates an exemplary logical to physical scheduling process according to embodiments of the present disclosure.

Referring now to FIG. 3, an exemplary logical to physical scheduling process is illustrated according to embodiments of the present disclosure. A plurality of physical cores 301 . . . 304 are connected by an on-chip inter-core network 305 . . . 307. In some embodiments, physical cores 301 . . . 304 are neurosynaptic cores as described above, having axons and neurons connected by synapses. Each physical core is paired with off-core storage memory 308 . . . 311 containing reconfiguration information for the cores. In some embodiments, neighboring cores may share an off-core storage, while in some embodiment each core has a dedicated off-core storage. In this way, one logical core is emulated by a physical core per computation step.

At a given time step $\tau$, physical core 301 performs computation 320. Computation is carried out for every physical core in parallel. In some embodiments, all neurons within each core are also updated in parallel. In some embodiments, axons are processed sequentially within each core.

Substantially concurrently with computation step 320, the local results of prior computation step $\tau-1$ are communicated 321 via inter-core network 322. For every neuron that fired in step $\tau-1$ (the previous step), a message is prepared and sent.

Substantially concurrently with computation step 320 and communication step 321, the results of prior computation step $\tau-2$ are processed 323. Such results may originate from other physical cores via inter-core network 322, or may original at the local physical core via loopback interface. For every physical core, all incoming messages are processed. Processing may include updating local axon buffers of the local core with appropriate inputs, or storing the message in a larger memory for later retrieval.

Also as part of processing step 323, the data necessary for configuring the local physical core for the next computation step, at $\tau+1$, is fetched from off-core storage 308.

In some embodiments, a synchronization barrier 324 is included. Barrier 324 ensures that steps 320, 321, and 323 have completed before advancing from $\tau$ to $\tau+1$.

In embodiments where a given computation step 320 at $\tau$ can depend on results from $\tau-3$ or before, the scheduling constraint may be relaxed by sequentializing steps 320, 321, 323, above. In some embodiments, two empty computation steps may be provided between consecutive non-empty computation steps to accommodate prior results.

In some embodiments, inter-core messages may be structured messages. Such messages are dispatched upon neuron firing on a source core during computation step $\tau$, as described above. In some embodiments, the structured message may include components [q, $\Delta$, A, N], where q is a target core, $\Delta$ is a difference such that the message will be used in computation step $\tau+\Delta$, A is a target axon, and N is the neuron firing value. It will be appreciated that the bound on $\Delta$ will dictate the size of the largest network. In some embodiments, a relative address is used for the target core. In this way, the cores may be tileable on a chip.

Upon receipt of a message at a core, for example of the [q, $\Delta$, A, N] form described above, the message is processed. In particular, the q value is used for initial routing to a destination core. Based on the $\Delta$ value, the message is scheduled. In some embodiments, is if a message cannot be scheduled locally to the core, for example because the input buffer is of limited size, the message may be stored in the off-core storage. If the message can be scheduled locally to the core, the target axon A is updated with the neuron filing value N. In case $\Delta$ indicates a future time window, the appropriate slot in the axon buffer is updated.

If the core has not yet been initialized, the configuration parameters are fetched from off-core storage. The biases, destinations, and synapse weights are either loaded or scheduled in future, depending upon the size of the buffer. In some embodiments, initialization also includes fetching any previous neuron firing messages received and stored off-core.

In some embodiments, each axon buffer in a given core includes a valid bit. If this bit is zero, the core does not compute anything within a given computation step. After a valid axon buffer is used, the valid bit is set to zero and the used axon buffer is cleared.

Figure 4:
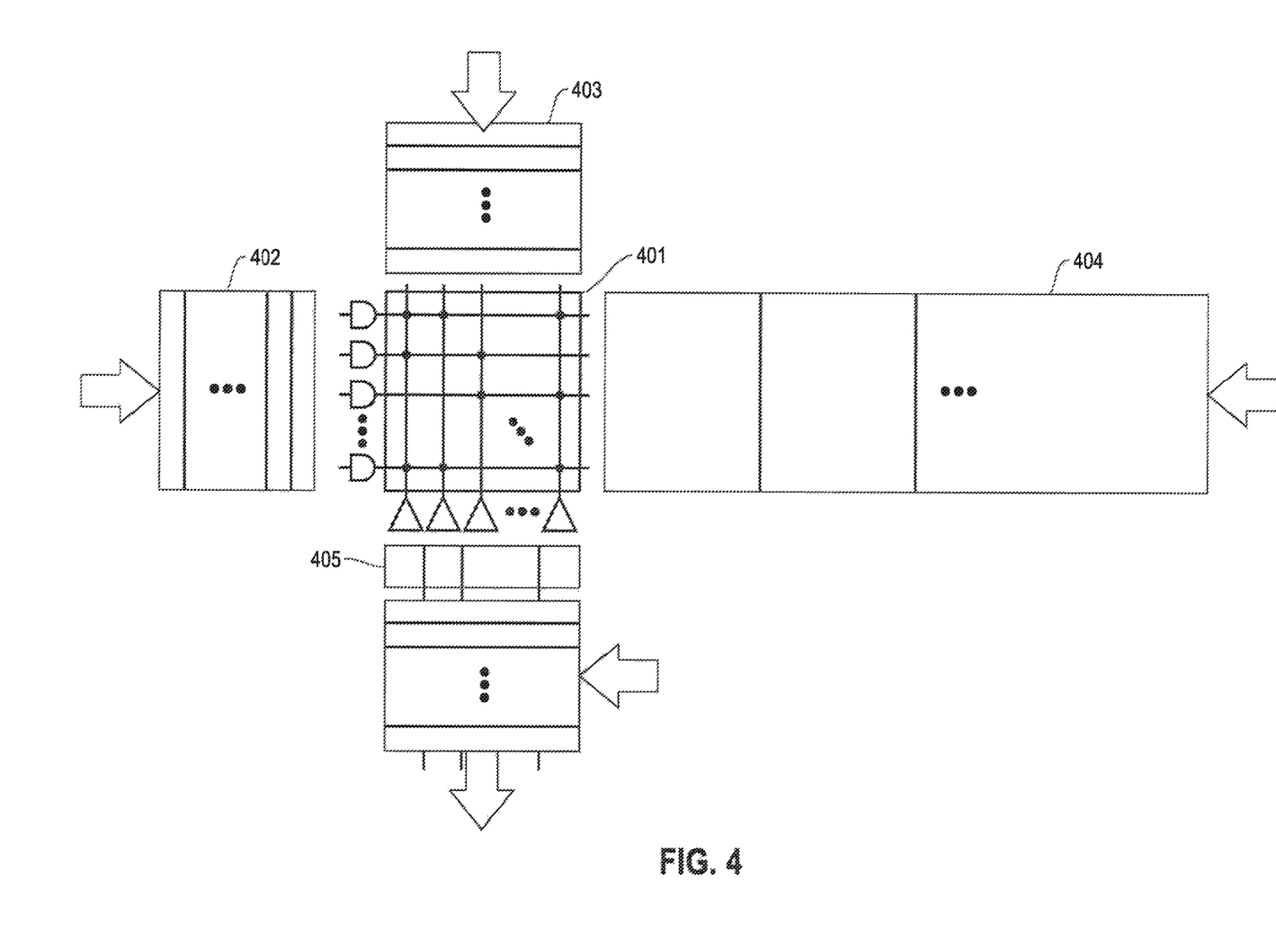
FIG. 4 illustrates an exemplary layout of core buffers according to embodiments of the present disclosure.

Referring now to FIG. 4, an exemplary layout of core buffers is illustrated according to embodiments of the present disclosure. It will be appreciated that the depicted buffer sizes are merely exemplary, and that various buffer sizes are suitable for use according to various embodiments of the present disclosure. A given core 401 includes axon buffers 402, which receive values as described above from other cores or from off-core storage. In some embodiments, as described further above, axon buffer 402 may correspond to individual time steps, and thus support queuing of inputs for future time steps. As noted above, in some embodiments, inputs that are scheduled further in advance than the axon buffers can accommodate may sent to off-core storage for future retrieval.

Neuron bias buffer 403 receives neuron biases from the off-core storage to configure core 401. As discussed above, the neuron bias buffer 403 may correspond to individual time steps, and thus support queuing of configuration parameters for future time steps. Synapse buffer 404 receives synapse configuration information from the off-core storage to configure core 401. As discussed above, the synapse buffer 404 may correspond to individual time steps, and thus support queuing of configuration parameters for future time steps. It will be appreciated that in some embodiments, one or more of the buffers may be omitted, allowing direct writing to the core or requiring that a given schedule have certain immutable parameters. For example, in some embodiments, the synapse buffer 404 is omitted.

Neuron outputs are gathered in neuron membrane potential registers 405. The destinations are loaded from off-core storage, and then send to destination cores accordingly.

In some exemplary embodiments, axon buffers provide a signed 4-bit value per axon. In some embodiments, neuron biases are signed 4-bit values per neuron. In some embodiments, synapses are given signed 1-bit values per synapse. In some embodiments, axon buffers are implemented as circular queues.

In an exemplary embodiments, off-core storage is implemented as a map from [q, Δ] to the associated axon buffer, neuron biases, neuron destinations, synapse weights, neuron function, and reuse bit. However, it will be appreciated that a variety of data structures are suitable for storing configuration information according to the present disclosure It will be appreciated that networks according to embodiments of the present disclosure are not limited to convolution networks. However, in some embodiments, convolution networks have greater energy-efficiency and speed as a result of weight reuse. Networks according to various embodiments support feed forward as well as recurrent connectivity. It will be appreciated that the network size may be tuned to obtain a desired trade-off between energy for speed.

Figure 5:
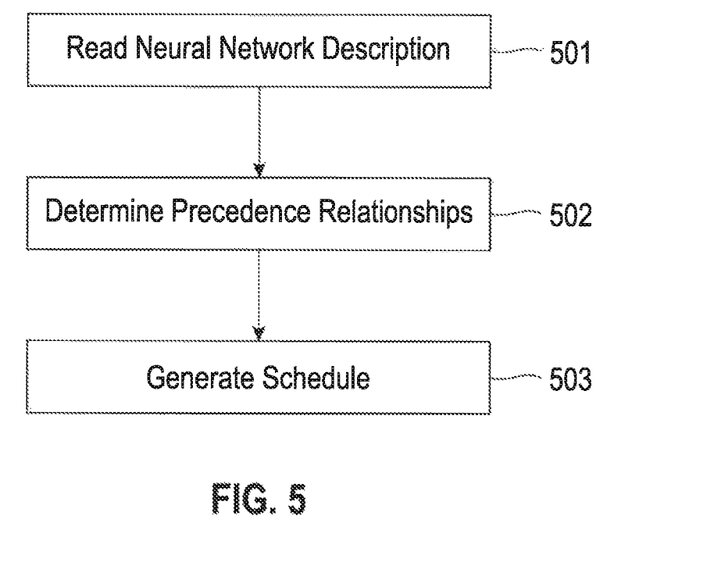
FIG. 5 illustrates an exemplary process for configuring a neural network according to embodiments of the present disclosure.

Referring now to FIG. 5, an exemplary process for configuring a neural network is illustrated according to embodiments of the present disclosure. At 501, a neural network description is read. The neural network description describes a plurality of logical cores. In some embodiments, the neural network description comprises a model file describing a network and a placement file describing the relative placement of cores.

At 502, a plurality of precedence relationships are determined among the plurality of logical cores. At 503, based on the plurality of precedence relationships, a schedule is generated that assigns the plurality of logical cores to a plurality of physical cores at a plurality of time slices. Based on the schedule, the plurality of logical cores of the neural network description are executed on the plurality of physical cores Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 6:
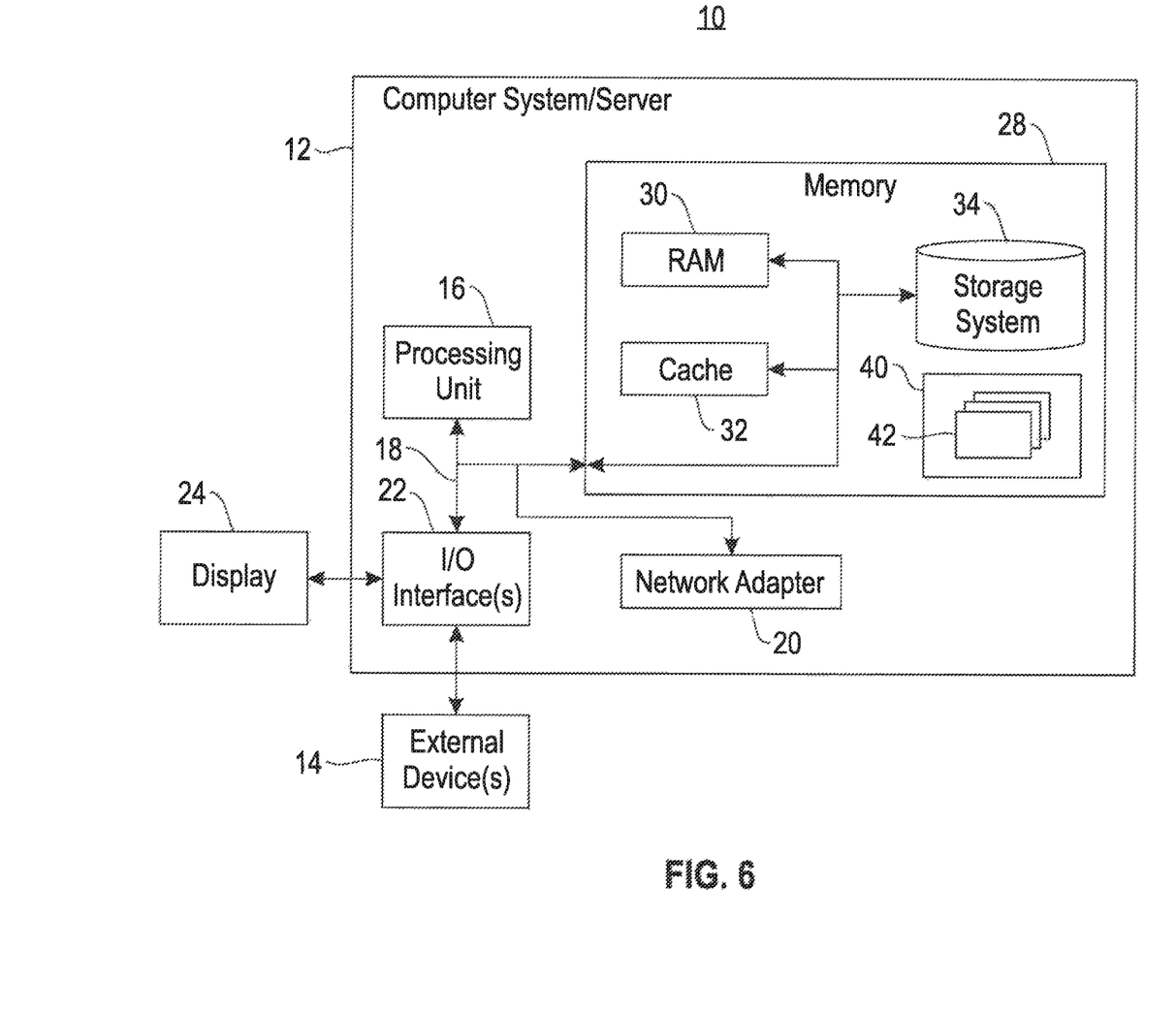
FIG. 6 depicts a computing node according to an embodiment of the present invention.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a neural network description describing a plurality of logical cores;
determining a plurality of precedence relationships among the plurality of logical cores;
based on the plurality of precedence relationships, generating a schedule assigning the plurality of logical cores to a plurality of physical cores at a plurality of time slices wherein
each logical core comprises a weight matrix, a vector of biases, and a neuron function,
generating the schedule comprises assigning an identification number to each of the plurality of logical cores, each pair of logical cores that have equivalent weight matrices, bias vectors, and neuron functions being assigned a same identification number,
generating the schedule comprises assigning logical cores having the same identification number to a same physical core; and
configuring the plurality of physical cores according to the assigned logical cores within each time slice of the plurality of time slices, thereby causing the plurality of logical cores to execute on the plurality of physical cores according to the generated schedule in an order consistent with the plurality of precedence relationships, wherein configuring the plurality of physical cores comprises reconfiguring synaptic weights of the physical cores at each time slice.

2. The method of claim 1, further comprising:
based on the schedule, executing the plurality of logical cores of the neural network description on the plurality of physical cores.

3. The method of claim 1, wherein the neural network description comprises a plurality of directed edges among the plurality of logical cores.

4. The method of claim 3, wherein generating the schedule comprises generating a directed acyclic graph corresponding to the plurality of logical cores.

5. The method of claim 1, wherein the plurality of logical cores number more than the plurality of physical cores.

6. The method of claim 1, wherein the neural network description comprises neuron biases, neuron destinations, or synapse weights.

7. The method of claim 1, further comprising:
determining a plurality of identity relationships among the plurality of logical cores, wherein
generating the schedule comprises preferentially assigning identical logical cores to the same physical core in consecutive time slices.

8. A method comprising:
reconfiguring a neuromorphic core, according to a schedule assigning a plurality of logical cores to the neuromorphic core at a plurality of time slices, thereby causing the plurality of logical cores to execute on the neuromorphic core according to the schedule in an order consistent with the plurality of precedence relationships wherein
each logical core comprises a weight matrix, a vector of biases, and a neuron function,
the schedule comprises an identification number for each of the plurality of logical cores, each pair of logical cores that have equivalent weight matrices, bias vectors, and neuron functions being assigned a same identification number,
the schedule assigning logical cores having the same identification number to a same physical core;
receiving a plurality of inputs to the neuromorphic core;
substantially concurrently to receiving the plurality of inputs, computing a first plurality of outputs of a neuromorphic core at a first time slice of the plurality of time slices;
substantially concurrently to the computing, sending a second plurality of outputs of the neuromorphic core, the second plurality of outputs being generated at a second time slice of the plurality of time slices, the second time slice preceding the first time slice,
wherein reconfiguring the plurality of physical cores comprises reconfiguring synaptic weights of the physical cores at each time slice.

9. The method of claim 8, wherein reconfiguring the neuromorphic core comprises reading a plurality of configuration parameters from an off-core memory.

10. The method of claim 9, wherein the off-core memory is on a same chip as the neuromorphic core.

11. The method of claim 9, wherein the off-core memory is on a different chip than the neuromorphic core.

12. The method of claim 9, wherein the plurality of configuration parameters comprise neuron biases, neuron destinations, or synapse weights.

13. The method of claim 8, wherein the second plurality of outputs is sent via an inter-core network.

14. The method of claim 8, wherein the plurality of inputs is received via an inter-core network, the method further comprising:
writing the plurality of inputs to an axon buffer of the neuromorphic core.

15. The method of claim 8, wherein the plurality of inputs is read from an off core memory.

16. The method of claim 8, wherein the plurality of inputs is read from an axon buffer coupled to the neuromorphic core.

17. A system comprising:
a reconfigurable neuromorphic core comprising a plurality of axons and a plurality of neurons;
an axon buffer coupled to the plurality of axons;
an off-core memory coupled to the neuromorphic core; and
an inter-core network coupled to the neuromorphic core, the reconfigurable neuromorphic core operable to:
read a plurality of configuration parameters from the off core memory, the plurality of configuration parameters corresponding to a logical core selected from a schedule assigning a plurality of logical cores to the neuromorphic core at a plurality of time slices wherein
each logical core comprises a weight matrix, a vector of biases, and a neuron function,
the schedule comprises an identification number for each of the plurality of logical cores, each pair of logical cores that have equivalent weight matrices, bias vectors, and neuron functions being assigned a same identification number,
the schedule assigning logical cores having the same identification number to a same physical core;

reconfigure according to the plurality of configuration parameters, thereby causing the plurality of logical cores to execute on the neuromorphic core according to the schedule in an order consistent with the plurality of precedence relationships;

receive a plurality of inputs;

substantially concurrently to receiving the plurality of inputs, compute a first plurality of outputs at a first time slice of the plurality of time slices;

substantially concurrently to the computing, send outputs generated at a second time slice of the plurality of time slices via the inter-core network, the second time slice preceding the first time slice, and wherein configuring the plurality of physical cores comprises reconfiguring synaptic weights of the physical cores at each time slice.

18. The system of claim 17, wherein the plurality of configuration parameters comprise neuron biases, neuron destinations, or synapse weights.

19. The system of claim 17, wherein the neuromorphic core is operable to send the second plurality of outputs via the inter-core network.

20. The system of claim 17, wherein the neuromorphic core is operable to receive the plurality of inputs via an inter-core network, and wherein the neuromorphic core is operable to write the plurality of inputs to the axon buffer.

21. The system of claim 17, wherein the neuromorphic core is operable to read the plurality of inputs from the off core memory.

22. The method of claim 17, wherein the neuromorphic core is operable to read the plurality of inputs from the axon buffer.

23. A computer program product for configuring a neural network, the computer program product comprising a computer readable storage medium having program instructions embodied therewith, the program instructions executable by a processor to cause the processor to perform a method comprising:

reading a neural network description describing a plurality of logical cores;

determining a plurality of precedence relationships among the plurality of logical cores;

based on the plurality of precedence relationships, generating a schedule assigning the plurality of logical cores to a plurality of physical cores at a plurality of time slices wherein each logical core comprises a weight matrix, a vector of biases, and a neuron function, generating the schedule comprises assigning an identification number to each of the plurality of logical cores, each pair of logical cores that have equivalent weight matrices, bias vectors, and neuron functions being assigned a same identification number, generating the schedule comprises assigning logical cores having the same identification number to a same physical core; and configuring the plurality of physical cores according to the assigned logical cores within each time slice of the plurality of time slices, thereby causing the plurality of logical cores to execute on the plurality of physical cores based on the schedule in an order consistent with the plurality of precedence relationships, and wherein configuring the plurality of physical cores comprises reconfiguring synaptic weights of the physical cores at each time slice.

24. The computer program product of claim 23, wherein the plurality of logical cores number more than the plurality of physical cores.

25. The computer program product of claim 23, wherein the neural network description comprises neuron biases, neuron destinations, or synapse weights.

26. The computer program product of claim 23, the method further comprising:

determining a plurality of identity relationships among the plurality of logical cores, wherein generating the schedule comprises preferentially assigning identical logical cores to the same physical core in consecutive time slices.

27. A system comprising:

a reconfigurable neuromorphic core comprising a plurality of axons and a plurality of neurons;

an axon buffer coupled to the plurality of axons;

an off-core memory coupled to the neuromorphic core; and an inter-core network coupled to the neuromorphic core, the reconfigurable neuromorphic core operable to:

read a plurality of configuration parameters from the off core memory, the plurality of configuration parameters corresponding to a logical core selected from a schedule assigning a plurality of logical cores to the neuromorphic core at a plurality of time slices wherein each logical core comprises a weight matrix, a vector of biases, and a neuron function, generating the schedule comprises assigning an identification number to each of the plurality of logical cores, each pair of logical cores that have equivalent weight matrices, bias vectors, and neuron functions being assigned a same identification number, the schedule assigning logical cores having the same identification number to a same physical core;

reconfigure according to the plurality of configuration parameters;

receive a plurality of inputs;

compute a first plurality of outputs at a first time slice of the plurality of time slices;

send outputs generated at a second time slice of the plurality of time slices via the inter-core network, the second time slice preceding the first time slice, thereby causing the plurality of logical cores to execute on the neuromorphic core according to the schedule in an order consistent with the plurality of precedence relationships, and wherein the plurality of logical cores are scheduled for computation on the neuromorphic core repeatedly and are processed in a loop.

28. A method comprising:

reading a plurality of configuration parameters from an off-core memory, the plurality of configuration parameters corresponding to a logical core selected from a schedule assigning a plurality of logical cores to the neuromorphic core at a plurality of time slices wherein each logical core comprises a weight matrix, a vector of biases, and a neuron function, the schedule comprises an identification number for each of the plurality of logical cores, each pair of logical cores that have equivalent weight matrices, bias vectors, and neuron functions being assigned a same identification number, the schedule assigning logical cores having the same identification number to a same physical core;

reconfiguring a neuromorphic core according to the plurality of configuration parameters, thereby causing the plurality of logical cores to execute on the neuromorphic core according to the schedule in an order consistent with a plurality of precedence relationships among the plurality of logical cores;

receiving a plurality of inputs to the neuromorphic core;

computing a first plurality of outputs of the neuromorphic core at a first time slice of the plurality of time slices;

sending via an inter-core network a second plurality of outputs of the neuromorphic core, the second plurality of outputs being generated at a second time slice of the plurality of time slices, the second time slice preceding the first time slice, wherein reconfiguring the plurality of physical cores comprises reconfiguring synaptic weights of the physical cores at each time slice.

* * * * *